US008380406B2

(12) United States Patent
MacFarlane et al.

(10) Patent No.: US 8,380,406 B2
(45) Date of Patent: Feb. 19, 2013

(54) USING DRIVING BEHAVIOR TO DETERMINE GEAR CHANGES OF AN AUTOMATIC TRANSMISSION

(75) Inventors: Kevin MacFarlane, Northville, MI (US); Henry A. Rebandt, Canton, MI (US); Andrew Wong, Kensington (AU); Alan Henriksen, Queanbeyan (AU); Peter J. Bradley, Torquay (AU); Philip J. Wiethe, Jr., Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 914 days.

(21) Appl. No.: 12/137,609

(22) Filed: Jun. 12, 2008

(65) Prior Publication Data

US 2009/0312926 A1      Dec. 17, 2009

(51) Int. Cl.
*G06F 17/00* (2006.01)
(52) U.S. Cl. .............................. 701/55; 701/51; 477/115
(58) Field of Classification Search .................. 701/51, 701/54, 55, 59; 477/115
See application file for complete search history.

(56) References Cited

U.S. PATENT DOCUMENTS

| 5,099,428 | A  | * | 3/1992  | Takahashi .................. 701/59 |
| 5,436,834 | A  | * | 7/1995  | Graf et al. ................... 701/55 |
| 5,544,053 | A  | * | 8/1996  | Nakashima .................. 701/57 |
| 6,012,009 | A  | * | 1/2000  | Kronenberg et al. .......... 701/56 |
| 6,216,068 | B1 | * | 4/2001  | Gimmler et al. ............. 701/36 |
| 6,269,293 | B1 | * | 7/2001  | Correa et al. ............... 701/51 |
| 6,370,464 | B1 | * | 4/2002  | Herbster et al. ............. 701/55 |
| 6,553,301 | B1 | * | 4/2003  | Chhaya et al. ............... 701/54 |
| 6,652,418 | B1 | * | 11/2003 | Gutknecht-Stohr et al. .. 477/120 |
| 7,976,430 | B2 | * | 7/2011  | Lee et al. .................... 477/62 |
| 2001/0003807 | A1 | * | 6/2001  | Lee ........................... 701/51 |
| 2003/0014173 | A1 | * | 1/2003  | Loeffler et al. .............. 701/51 |
| 2004/0014564 | A1 | * | 1/2004  | Jager et al. ................. 477/115 |
| 2004/0097328 | A1 | * | 5/2004  | Makiyama et al. ............ 477/43 |
| 2006/0006008 | A1 | * | 1/2006  | Brunemann et al. ......... 180/65.2 |
| 2006/0040791 | A1 | * | 2/2006  | Nakajima et al. ............ 477/111 |
| 2006/0224291 | A1 | * | 10/2006 | Geist et al. .................. 701/51 |
| 2007/0142978 | A1 | * | 6/2007  | Yamamura et al. ............ 701/1 |
| 2007/0179017 | A1 | * | 8/2007  | Yamada et al. ............. 477/107 |
| 2008/0182718 | A1 | * | 7/2008  | Ido et al. .................... 477/125 |
| 2008/0293540 | A1 | * | 11/2008 | Cho .......................... 477/78 |
| 2008/0305927 | A1 | * | 12/2008 | Gierling et al. .............. 477/97 |
| 2009/0187317 | A1 | * | 7/2009  | Sugano et al. ............... 701/54 |
| 2009/0192015 | A1 | * | 7/2009  | Lee et al. .................... 477/65 |
| 2009/0215586 | A1 | * | 8/2009  | Kresse ....................... 477/110 |
| 2009/0233765 | A1 | * | 9/2009  | Tao et al. .................... 477/127 |

* cited by examiner

*Primary Examiner* — Helal A Algahaim
(74) *Attorney, Agent, or Firm* — James Dottavio; MacMillian, Sobanski & Todd, LLC (57) ABSTRACT

A method for changing the timing of gear changes of an automatic transmission for a motor vehicle including repetitively updating a current value of a count whose value is a measure of driving behavior, performing an evaluation of driving behavior and updating the current value by a value determined from the evaluation, determining shift schedules that define the occurrence of a gear change to be produced by the transmission, and using the updated current value to establish from among the shift schedules a shift schedule that defines a gear change to be produced by the transmission.

26 Claims, 8 Drawing Sheets

|  | Counter Min | Counter Max | Entry Offset |
|---|---|---|---|
| Init to Normal | DS_TBAR_OFFSET[0,0] | DS_TBAR_OFFSET[0,1] | DS_TBAR_OFFSET[0,2] |
| Init to Sport | DS_TBAR_OFFSET[1,0] | DS_TBAR_OFFSET[1,1] | DS_TBAR_OFFSET[1,2] |
| NORMAL to SPORT | DS_TBAR_OFFSET[2,0] | DS_TBAR_OFFSET[2,1] | DS_TBAR_OFFSET[2,2] |
| NORMAL to XSPORT | DS_TBAR_OFFSET[3,0] | DS_TBAR_OFFSET[3,1] | DS_TBAR_OFFSET[3,2] |
| SPORT to NORMAL | DS_TBAR_OFFSET[4,0] | DS_TBAR_OFFSET[4,1] | DS_TBAR_OFFSET[4,2] |
| XSPORT to NORMAL | DS_TBAR_OFFSET[5,0] | DS_TBAR_OFFSET[5,1] | DS_TBAR_OFFSET[5,2] |
| SPORT-TIP to NORMAL | DS_TBAR_OFFSET[6,0] | DS_TBAR_OFFSET[6,1] | DS_TBAR_OFFSET[6,2] |
| SPORT or XSPORT to "+" | DS_TBAR_OFFSET[7,0] | DS_TBAR_OFFSET[7,1] | DS_TBAR_OFFSET[7,2] |
| SPORT or XSPORT to "-" | DS_TBAR_OFFSET[8,0] | DS_TBAR_OFFSET[8,1] | DS_TBAR_OFFSET[8,2] |
| NORMAL to "+" | DS_TBAR_OFFSET[9,0] | DS_TBAR_OFFSET[9,1] | DS_TBAR_OFFSET[9,2] |
| NORMAL to "-" | DS_TBAR_OFFSET[10,0] | DS_TBAR_OFFSET[10,1] | DS_TBAR_OFFSET[10,2] |

Fig. 7

| | TBL_DS_LKY_BKT_SLP | | | | | | |
|---|---|---|---|---|---|---|---|
| | Counter - Normal Value | | | | | | |
| Load / Grade | -60 | -30 | -10 | 0 | 30 | 60 | 100 |
| 1.0 | 1.00 | 1.00 | 1.00 | 1.00 | 1.00 | 1.00 | 1.00 |
| 2.0 | 1.12 | 1.07 | 1.03 | 1.00 | 0.98 | 0.95 | 0.90 |
| 3.0 | 1.12 | 1.07 | 1.03 | 1.00 | 0.98 | 0.95 | 0.90 |
| 4.0 | 1.06 | 1.03 | 1.03 | 1.00 | 0.95 | 0.93 | 0.90 |
| 5.0 | 1.00 | 1.00 | 1.00 | 1.00 | 0.95 | 0.93 | 0.90 |

Fig. 3

| | TBL_DS_LKY_BKT_INT | | | | | | |
|---|---|---|---|---|---|---|---|
| | Counter - Normal Value | | | | | | |
| Load / Grade | -60 | -30 | -10 | 0 | 30 | -60 | -60 |
| 1.0 | 0.00 | 0.00 | 0.00 | 0.00 | 0.00 | 0.00 | 0.00 |
| 2.0 | 3.00 | 2.00 | 1.00 | 0.00 | -1.00 | -2.00 | -3.00 |
| 3.0 | 3.00 | 2.00 | 1.00 | 0.00 | -1.00 | -2.00 | -3.00 |
| 4.0 | 2.50 | 1.80 | 1.00 | 0.00 | -1.50 | -2.50 | -3.50 |
| 5.0 | 2.00 | 1.50 | 1.00 | 0.00 | -1.50 | -2.50 | -3.50 |

|  | Accelerator pedal rates (%/sec) | | | | |
|---|---|---|---|---|---|
| Outspeed (rpm) | -400.0 | -200.0 | 200.0 | 450.0 | 600.0 |
| 480.0 | 2.0 | 0.0 | 1.0 | 2.0 | 3.0 |
| 1200.0 | 1.0 | 1.0 | 1.0 | 2.0 | 4.0 |
| 1920.0 | 0.0 | 1.0 | 2.0 | 3.0 | 5.0 |
| 2880.0 | -1.0 | 1.0 | 2.0 | 4.0 | 6.0 |
| 3840.0 | -1.0 | 1.0 | 3.0 | 5.0 | 7.0 |

Fig. 8

|  | Accelerator Position (%) | | | | |
|---|---|---|---|---|---|
| Load/ Grade | 20 | 30 | 45 | 60 | 100 |
| 1.0 | 0.0 | 3.0 | 4.0 | 5.0 | 20.0 |
| 2.0 | 3.0 | 3.0 | 4.0 | 5.0 | 20.0 |
| 3.0 | 0.0 | 3.0 | 4.0 | 5.0 | 20.0 |
| 4.0 | 0.0 | 1.5 | 3.0 | 4.0 | 20.0 |
| 5.0 | 0.0 | 0.0 | 2.0 | 3.0 | 20.0 |

Fig. 9

|  | Engine Torque (Nm) | | | | |
|---|---|---|---|---|---|
| Load/ Grade | 20 | 30 | 45 | 60 | 100 |
| 1.0 | 0.0 | 3.0 | 4.0 | 5.0 | 20.0 |
| 2.0 | 3.0 | 3.0 | 4.0 | 5.0 | 20.0 |
| 3.0 | 0.0 | 3.0 | 4.0 | 5.0 | 20.0 |
| 4.0 | 0.0 | 1.5 | 2.5 | 3.5 | 20.0 |
| 5.0 | 0.0 | 0.0 | 1.0 | 2.0 | 20.0 |

| | TBL_DS_LAT_ACCEL_INC | | | | |
|---|---|---|---|---|---|
| | Absolute Lateral Acceleration (m/s^2) | | | | |
| Vehicle Speed (km/h) | 0.0 | 3.5 | 5.0 | 6.0 | 7.0 |
| 20.0 | 0.0 | 0.0 | 1.0 | 2.0 | 3.0 |
| 50.0 | 0.0 | 1.0 | 2.0 | 3.0 | 4.0 |
| 80.0 | 0.0 | 2.0 | 3.0 | 5.0 | 6.0 |
| 120.0 | 0.0 | 3.0 | 4.0 | 6.0 | 8.0 |
| 160.0 | 0.0 | 4.0 | 5.0 | 7.0 | 10.0 |

| | FN_DS_LAT_CTR_MOD | | | | |
|---|---|---|---|---|---|
| 104 | Counter - Base Value  105 | | | | |
| | -50.0 | -30.0 | 0.0 | 50.0 | 100.0 |
| Driver Multiplier | 0.0 | 0.5 | 0.8 | 1.0 | 1.0 |

Fig. 12

| Aggressive Braking | Normal Braking or Acceleration | Aggressive Acceleration |
|---|---|---|
| Increment Counter | Decrement Counter | Increment Counter |

Fig. 13

| | Longitudinal Acceleration (m/sec^2) | | | | | |
|---|---|---|---|---|---|---|
| Output Speed (rpm) | -6.0 | -2.0 | 2.0 | 4.0 | 6.0 | 8.0 |
| 480.0 | -2.0 | -1.0 | -1.0 | 1.0 | 2.0 | 3.0 |
| 480.0 | 1.0 | 0.0 | 1.0 | 2.0 | 3.0 | 4.0 |
| 480.0 | 3.0 | 1.0 | 2.0 | 3.0 | 4.0 | 5.0 |
| 480.0 | 4.0 | 3.0 | 3.0 | 4.0 | 5.0 | 6.0 |
| 480.0 | 5.0 | 5.0 | 5.0 | 6.0 | 7.0 | 8.0 |

USING DRIVING BEHAVIOR TO DETERMINE GEAR CHANGES OF AN AUTOMATIC TRANSMISSION

BACKGROUND OF THE INVENTION

1. Field of the Invention

This invention relates generally to an automatic transmission for a motor vehicle, and, more particularly, to a method for establishing a gear shift schedule that is compatible with driving behavior.

2. Description of the Prior Art

Gear changes in a step-change automatic transmission are produced by a shift control system when a current operating state, defined by throttle opening and vehicle speed, crosses an upshift or downshift boundary, which can be represented in a shift schedule graph. The shift control system controls a solenoid valves of a hydraulic system such that hydraulic pressure, supplied to friction clutches and brakes, alternately cause their engagement and disengagement, resulting in the shifting of the transmission into various gears that affect the speed of the transmission output shaft relative to the speed of the input shaft.

The vehicle operator's manual control of a shift lever can be used to select operation of the transmission in a normal range, wherein the gears are produced automatically. The shift lever can also be placed in a track for manual gear selection, wherein the transmission can be upshifted and downshifted from the current gear at the driver's initiative. The shift control responds to the manual selection in a manner that is similar to its operation in the automatic mode.

The shift control system may contain multiple shift schedules each producing a desired gear change timing in a range between conservative or economy operation of the vehicle and aggressive or sporty operation, usually represented by throttle opening, i.e., the degree to which an accelerator pedal is depressed, and vehicle speed.

In the economy mode, a gear shift pattern is designed such that an upshifting operation is quickly realized to improve the fuel consumption ratio. In the sporty mode, a shift pattern is designed such that an upshifting point is moved to a high speed so that engine torque can be increased.

However, since the shift schedules are fixed in an electronic memory, a need exists in the industry to optimize the gear shifting according to variations in engine torque, and running resistance and other parameters that reflect the operator's intent and driving behavior.

SUMMARY OF THE INVENTION

A method for changing the timing of gear changes of an automatic transmission for a motor vehicle including repetitively updating a current value of a count whose value is a measure of driving behavior, performing an evaluation of driving behavior and updating the current value by a value determined from the evaluation, determining shift schedules that define the occurrence of a gear change to be produced by the transmission, and using the updated current value to establish from among the shift schedules a shift schedule that defines a gear change to be produced by the transmission.

The type of driver is determined using the combined output of various evaluations that are linked to driving behavior. An algorithm allows individual methods to be calibrated in or out, provides a prioritization scheme and allows certain evaluations to preempt others.

Uphill detection estimates a road gradient by comparing actual vehicle acceleration to nominal unloaded acceleration on a level road based on current engine torque and current gear ratio. Downhill detects a negative road gradient if vehicle acceleration exceeds a calibrateable threshold without the driver further accelerating for a calibrateable period.

A matrix of shift schedules is indexed by a measure of driving behavior and the detected vehicle load or road grade. The algorithm interpolates between adjacent shift schedules to obtain shift points based on the current driving behavior and the load/grade.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
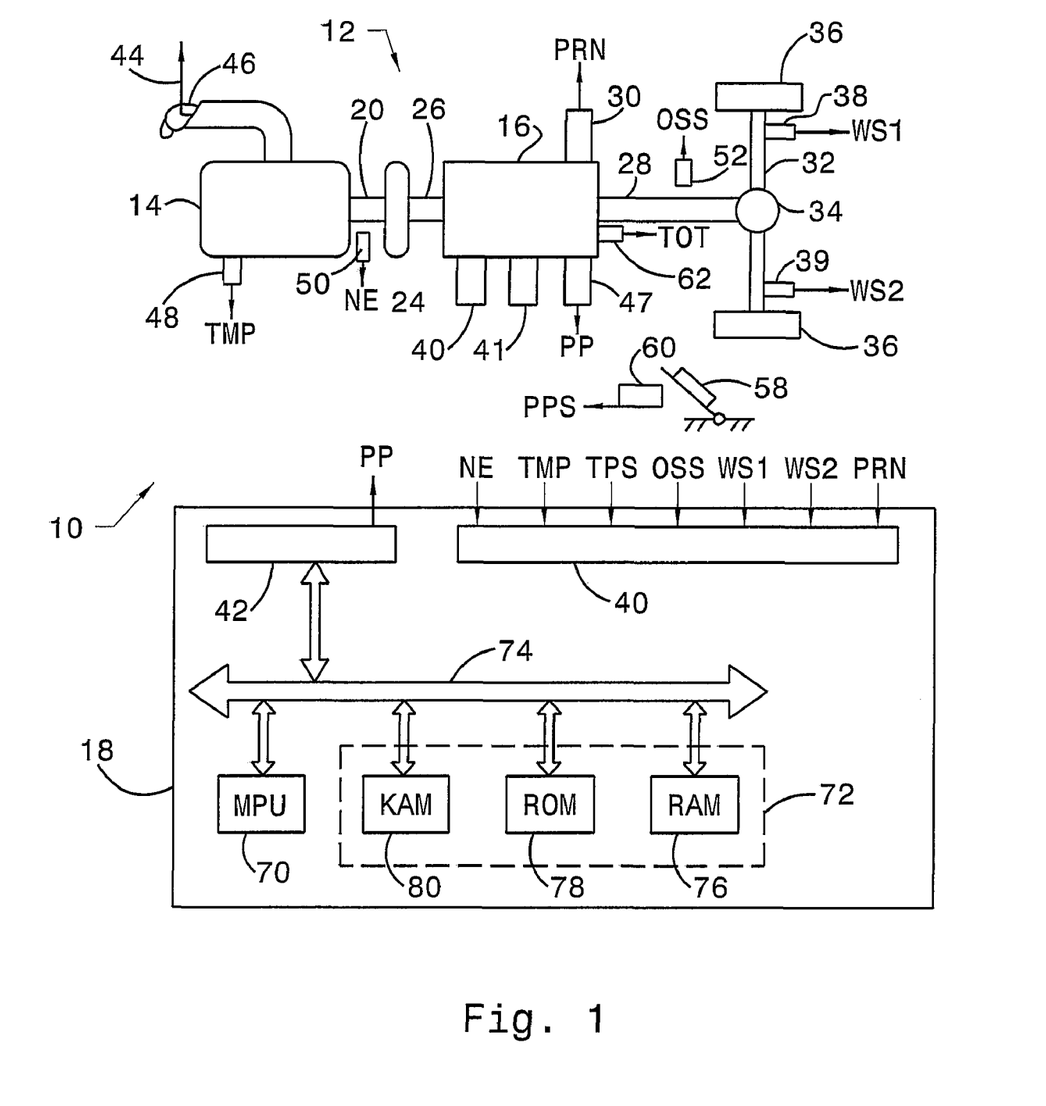
FIG. 1 is schematic diagram showing a powertrain for an automotive vehicle including a microprocessor for controlling the vehicle transmission and engine.

Referring to the drawings, there is illustrated in FIG. 1 a block diagram illustrating a system 10 for controlling the powertrain 12 of a motor vehicle. The powertrain 12 includes an internal combustion engine 14 coupled to an automatic transmission 16. The system 10 includes a controller 18, which is in communication with engine 14 and transmission 16 for providing various information and control functions. Engine 14 is connected to transmission 16 by a crankshaft 20, which is connected to a transmission torque converter 24.

Automatic transmission 16 produces multiple gear ratios, which are produced by various gears and associated frictional elements such as clutches, brakes, and couplers. The gearing produces torque reduction and torque multiplication ratios between transmission input shaft 26 and output shaft 28. Transmission 16 is preferably electronically controlled by various shift solenoids 40, 41, which control the state of the clutches and brakes, which produce the appropriate gear ratio based on current operating conditions and driver input. A transmission shift lever position sensor (PRN) 30 provides a signal representing the operator's selected gear or driving range, such as Park, Reverse, Neutral, Drive, etc.

Depending on the particular application, output shaft 28 may be coupled to one or more axles 32 via a differential mechanism 34. Each axle 32 may include two or more wheels 36 having corresponding wheel speed sensors 38, whose output signals are WS1 and WS2.

In addition to the sensors described above, powertrain 12 preferably includes sensors in communication with corresponding input ports 40 of controller 18, which sense or monitor the current operating and ambient conditions of powertrain 12. A plurality of actuators communicate with controller 18 via output ports 42 to control powertrain 12 in response to commands generated by controller 18.

The sensors preferably include a throttle valve position sensor (TPS) 44, which monitors the position of a throttle valve 46. A temperature sensor (TMP) 48 provides an indication of the engine coolant temperature, or engine oil temperature. An engine speed sensor (NE) 50 monitors rotational speed of crankshaft 20. Another rotational speed sensor, the output shaft speed sensor (OSS) 52, provides an indication of the speed of output shaft 28, which may be used to determine the vehicle speed based on the gear ratios of the final drive gearset, differential 34, and the size of wheels 36. Wheel speed sensors 38 may be used as secondary sources providing an indication of the output shaft speed and vehicle speed.

Depending on the particular application requirements, various sensors may be omitted or alternative sensors provided which generate signals indicative of related sensed parameters. Values corresponding to ambient or operating conditions may be inferred or calculated using one or more of the sensed parameters without departing from the spirit or scope of the present invention.

An accelerator pedal 58 is operated manually by the driver to control the output of powertrain 12. A pedal position sensor 60 provides an indication of the position of accelerator pedal 58, preferably in the form of counts, with an increasing number of counts indicating a request for increased power output.

Automatic transmission 16 is controlled to produce shifts between gears, each gear having an associated speed ratio, i.e., the speed of input shaft 26 divided by the speed of output shaft 28. Alternatively, transmission 16 may be a continuously variable transmission, such as a belt drive or traction drive transmission, which continually changes its speed ratio without producing step change gear shifts between discrete gears.

Changes in the speed ratio of a step change transmission may be controlled by hydraulic line pressure using an appropriate actuator (PP) 47 in combination with shift solenoids 40, 41, which pressure and vent the servos in response to command signals from controller 18. The hydraulic friction clutches and brakes engage and disengage according to the pressurized and vented state of the servos, whereby the appropriate gear ratio is produced. A temperature sensor 62 produces a signal TOT representing the transmission oil temperature.

Controller 18 is preferably a microprocessor-based controller, which provides integrated control of the engine 14 and transmission 16, or separate engine and transmission controllers depending on the particular application. Controller 18 includes a microprocessor 70 in communication with input ports 40, output ports 42, and computer readable media 72 via a data/control bus 74. Computer readable media 72 may include various types of volatile and nonvolatile memory such as random access memory (RAM) 76, read-only memory (ROM) 78, and keep-alive memory (KAM) 80. The functions of the various types of volatile and nonvolatile storage may be implemented by any of a number of known physical devices including, but not limited to EPROMs, EEPROMs, PROMS, flash memory, and the like.

Computer readable media 72 include stored data representing instructions executable by microprocessor 70 to control hydraulic pressure during shifting. For example, various electronically stored gear shift schedules are used to determine the desired gear in which transmission 16 should be operating.

Another electronically stored algorithm, the driver style algorithm, determines the current mode of driving behavior exhibited by the vehicle operator. The perceived mode of driving behavior is used to select the appropriate gear shift schedule that corresponds to the current driver behavior. More specifically, the perceived driver behavior, represented by the value in ds_counter 90, is used in combination with a road grade index to select at least one shift schedule or to interpolate among multiple shift schedules. The algorithm interpolates among shift schedules to best meet the driver's requirements on the basis of the value in the ds_counter 90. The interpolated shift schedule is used to determine the vehicle parameters at which an upshift or downshift is to occur.

Figure 2:
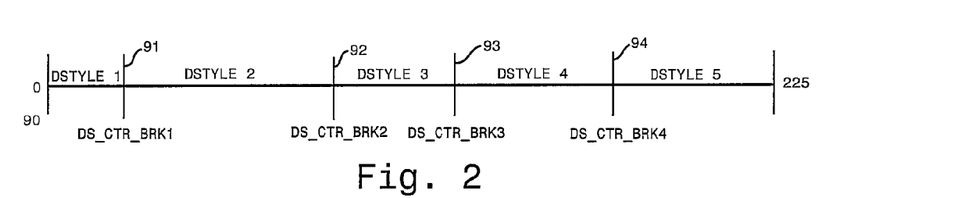
FIG. 2 is a graph that illustrates the break points between diver styles on the basis if the value in the ds_counter.

FIG. 2 illustrates the ds-counter having a range 0-255 and marked with break points 91-94. The value in ds_counter 90 is used to select a predetermined shift schedule or to interpolate between shift schedules that are located in a matrix 120 of shift schedules 122, as shown in and described with reference to FIG. 16. The driver style algorithm is used in conjunction with a load/grade detection algorithm, to interpolate among shift schedules located in a matrix of shift schedules indexed by the value in ds_counter 90 and the magnitude of the vehicle load or road grade.

Leaky Bucket Function

Figure 6:
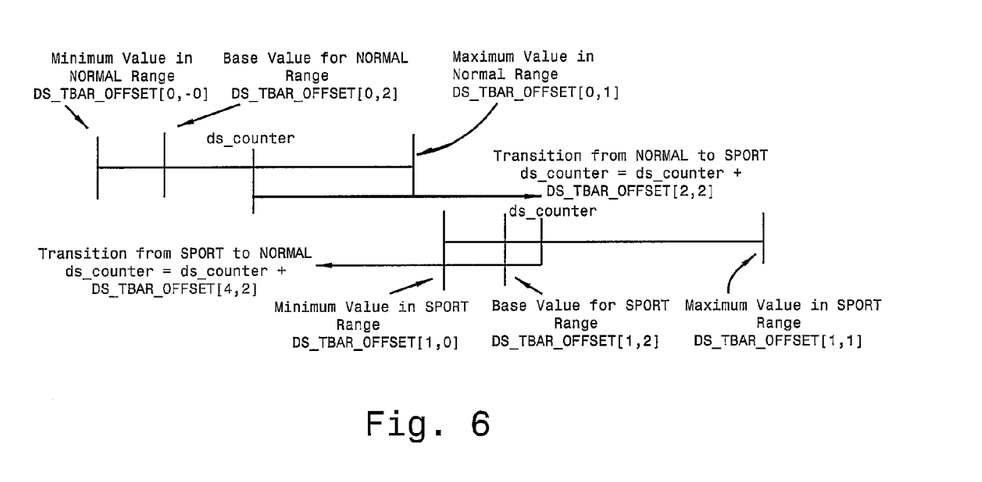
FIG. 6 is a chart that illustrates the range of offsets of the ds_counter due to transitions between normal and sport mode operation.

Because terrain, road conditions and driving behavior change rapidly, the driver style algorithm seeks the entry or base counter value in either sport or normal mode, as shown in FIG. 6. The vehicle operator must continuously exhibit economical or sporty behavior for ds_counter 90 to deviate over a lengthy period from the range of "normal" values in ds_counter 90. This tendency toward the normal values avoids maintaining use of a shift schedule that may be objectionable after the road conditions change from those that led to its selection, and avoids classifying the driver as belonging to a particular type.

A leaky bucket function sets the rate at which the ds_counter 90 progresses toward the base value of the current operating range under a variety of operating conditions, thereby providing a look-ahead function. The leaky bucket function allows different rates of change of the value in ds_counter 90 based on the current counter value and an estimate of the driver's intent. For example, the rate of increase of the value in ds_counter 90 may be smaller if a driver exhibiting conservative behavior holds throttle 46 open or depresses pedal 58 on a downgrade to maintain vehicle momentum in order to ascend the next hill. Similarly, a downhill stretch should allow a driver who currently exhibits aggressive or sporty driving behavior to back-out, i.e., to release the accelerator pedal 58, without reducing the value in ds_counter 90. If a driver exhibiting economical driving behavior is on an uphill, the rate of increase of value in ds_counter 90 can be smaller since accelerator pedal position PPS must be more aggressive simply to negotiate the hill.

The rate at which the value in ds_counter 90 changes due to the leaky bucket is a function of the difference between the current value in ds_counter 90 and the base value. The base values are calibrated values determined empirically from experience with a range of driver styles. Thus the driver must persist in driving behavior toward either extremity, conservative or aggressive, to maintain a high or low value in the ds_counter. By decreasing the rate of change of the count, the leaky bucket can be calibrated to allow the driver style algorithm to learn the driver's tendencies or intent from driving behavior over a long-term.

During operation in normal mode, the leaky bucket function moves the value in ds_counter 90 toward the base value in normal mode DS_TBAR_OFFSET[0,2], as shown in FIG. 6. During operation in sport mode, the leaky bucket function moves the value in counter 90 toward the base value in sport mode DS_TBAR_OFFSET[1,2], as shown in FIG. 6. The offsets are indexed by the coordinates [0,2] and [1,2] of arrays stored in electronic memory.

Figure 3:
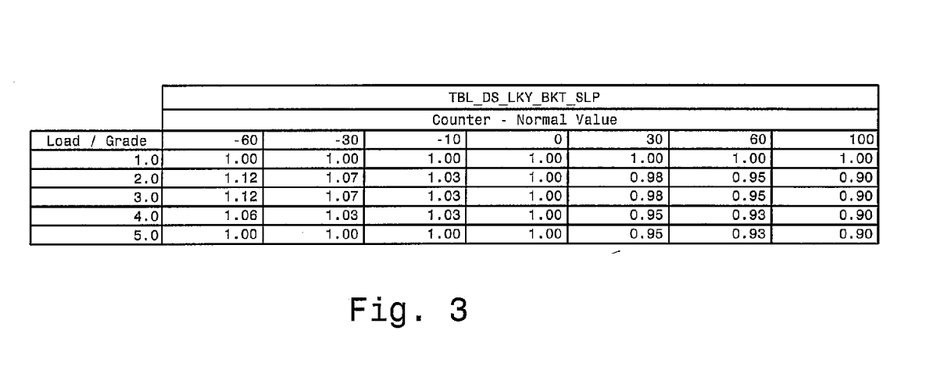
FIG. 3 is a chart that illustrates intercepts of the ds-counter for the leaky bucket function.
Figure 4:
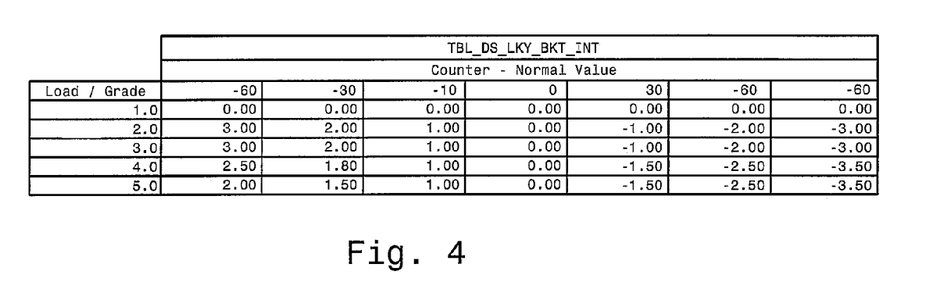
FIG. 4 is a chart that illustrates slopes of the ds-counter for the leaky bucket function.

Ds_counter 90 is incremented and decremented at regular time intervals using a value determined from the following equation:

$$ds\_counter\,(n) = TBL\_DS\_LKY\_BKT\_SLP \\ [ds\_counter\,(n-1)] + TBL\_DS\_LKY\_BKT\_INT \quad (1)$$

wherein ds_counter (n) is the magnitude of the increment or decrement to the ds_counter 90 during the current execution of the driver style algorithm; TBL_DS_LKY_BKT_SLP is an electronically stored lookup table of calibrated factors or slopes of a ds_counter function, as shown in FIG. 3; TBL_DS_LKY_BKT_INT is an electronically stored lookup table of calibrated intercepts of the ds_counter function, as shown in FIG. 4; and ds_counter (n-1) is a value of ds_counter 90 at a previous execution, usually the value from the execution that immediately precedes the current execution. The equation, therefore, provides a gain, i.e., the product of that value and the slope TBL_DS_LKY_BKT_SLP, plus the intercept, TBL_DS_LKY_BKT_INT.

Each of the lookup tables of FIGS. 3 and 4 is indexed by two variables: (1) the difference between the current value in counter 90 and the base value for the mode; and (2) a variable representing the magnitude of the current vehicle load or road grade.

The chart of FIG. 3 shows the table of slopes of the function of equation (1) that corresponds to the difference between the current value in ds_counter 90 and the normal value, and to a range of vehicle loads and road grades. Notice that a large negative value of the difference between the current value in ds_counter 90 and the normal value indicates a conservative driver behavior. A large positive value of the difference between the current value in ds_counter 90 and the normal value indicates an aggressive driver behavior.

The chart of FIG. 4 shows the table of intercepts of the function of equation (1) for the difference between the current value in ds_counter 90 and the normal value, and for a range of vehicle loads and road grades. Again, a large negative value of the difference between the current value in ds_counter 90 and the normal value indicates a conservative driver behavior, and a large positive value of the difference between the current value in ds_counter 90 and the normal value indicates an aggressive driver behavior.

Figure 5:
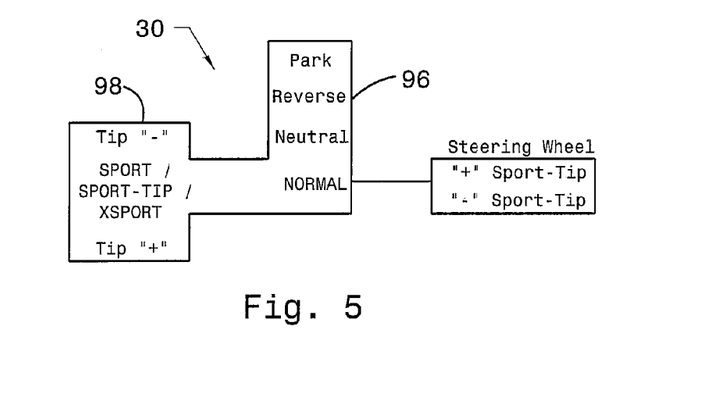
FIG. 5 is a schematic diagram of a gear selector having a normal range for automatically produced gear changes, and a range wherein manually selected upshifts and downshifts are actuated.

The driver style algorithm addresses Normal, Sport and Extreme Sport modes of operation of a manually operated gear selector 30, shown in FIG. 5. Sport mode is available by moving the PRN range and gear selector 30, into a SST gate 98 from the Normal PRN gate 96 without forcing a manual upshift by moving selector 30 to a (+) position, or a downshift by moving selector 30 to a (-) position. Two rapid movements of the PRN selector 30 between Normal PRN gate 96 and the SST Sport gate 98 and ending in SPORT results in the Extreme Sport mode (XSPORT). In Extreme Sport mode, a unique offset is applied that puts the driver in a very aggressive shift schedule.

Figure 7:
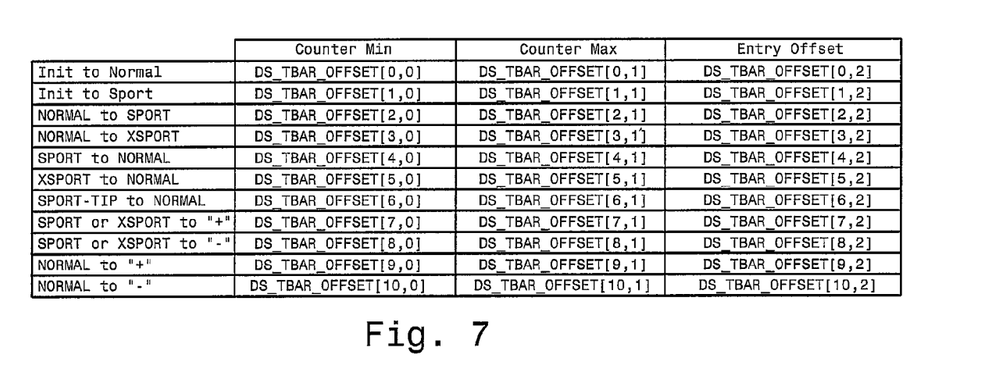
FIG. 7 is a chart that illustrates minimums, maximums and offsets of the ds_counter due to transitions between normal and sport mode operation.

The driver style algorithm provides unique offsets for transitions between modes. As shown in FIG. 7, a transition of the range selector 30 from Normal directly to (+) or (-) provides a different counter value increment than a transition from Sport to (+) or (-).

Figure 17:
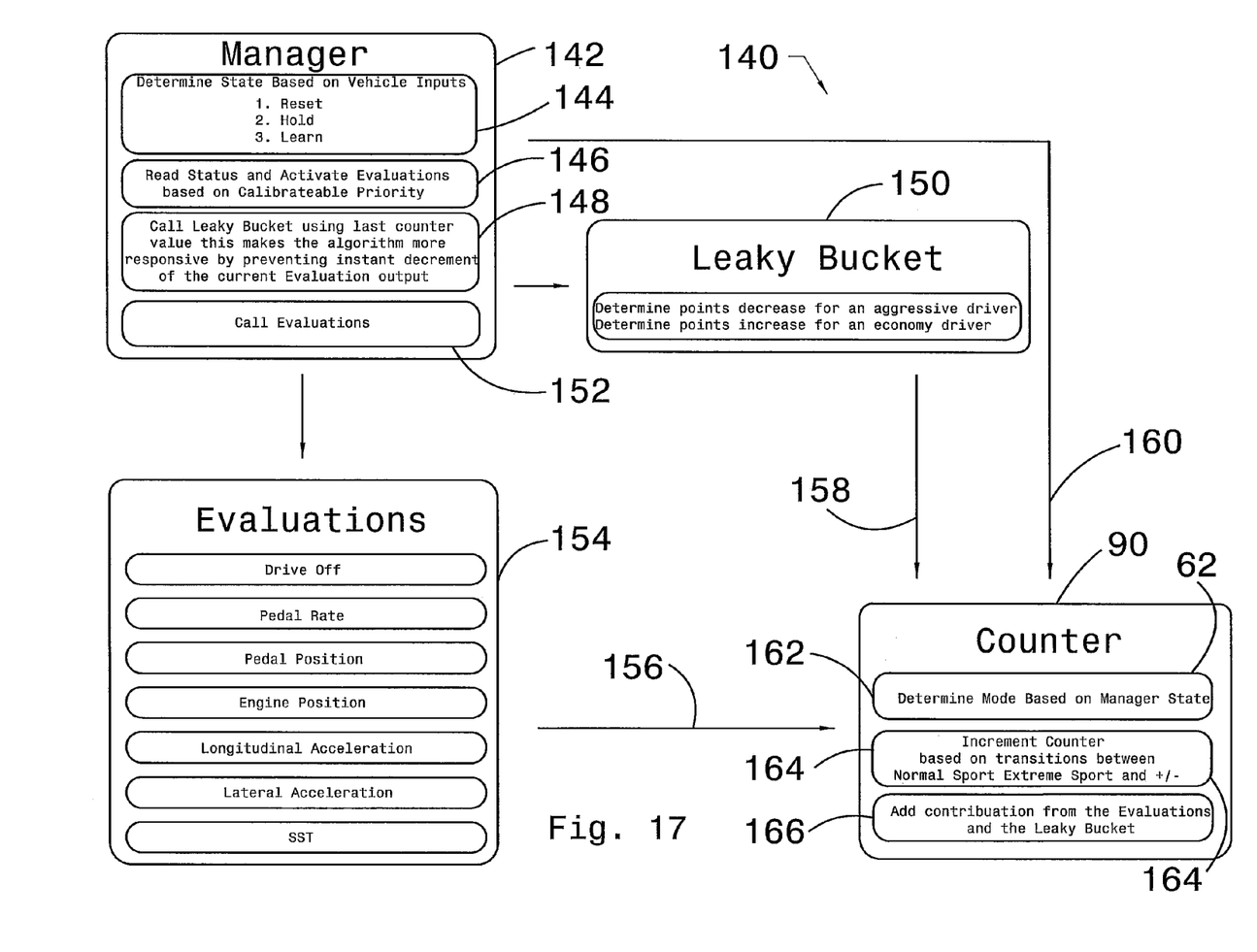
FIG. 17 is a diagram of an algorithm for determining the ds_counter value.

The driver style algorithm 140, illustrated in FIG. 17, uses seven evaluations, related closely to the driver's behavior, to increment and decrement the value in ds_counter 90. The seven evaluations include driveaway, accelerator pedal rate, accelerator pedal position, demanded torque, lateral vehicle acceleration, longitudinal vehicle acceleration and SST.

Drive Away Evaluation

The drive away evaluation considers how aggressively the driver launches the vehicle from a stop to provide a quick initial evaluation of the driver's behavior. This evaluation uses accelerator pedal position PPS and the time rate of change of accelerator pedal position rather than longitudinal acceleration because it occurs at low speed. The drive away evaluation looks for the maximum accelerator pedal position and maximum rate of change over the time required to reach a calibrateable reference speed of the output shaft 28.

Accelerator pedal position (dd_trans) and pedal rate (dd_rate) are sampled every sampling interval. The drive away evaluation samples accelerator pedal position and looks for the maximum accelerator pedal position over a short time period. Drive away evaluation also looks at the rate of change of accelerator pedal position during this short time period. A table lookup, indexed by accelerator pedal position and accelerator pedal rate, is then performed and its output is rounded to the nearest integer to determine the increment or decrement to the ds_counter 90.

Two separate trigger points of the speed of output shaft 28 for the drive away evaluation are $DS_{13}DA_{13}OSS_{13}MIN$ and DS DA OSS MAX. The DS DA OSS MIN is the threshold below which output shaft speed OSS must fall before the drive away evaluation starts. If OSS exceeds DS DA OSS MAX the captured values of accelerator pedal position and accelerator pedal rate are used to determine the counter increment from the drive away evaluation.

Pedal Rate Evaluation

The maximum pedal rate is stored during each calibrateable time interval. At the end of the interval, points, which change the value of ds_counter 90, are awarded based on a table of pedal rate and the current speed of output shaft 28, which is partially determined by the gear in which transmission 16 is operating.

Figure 8:
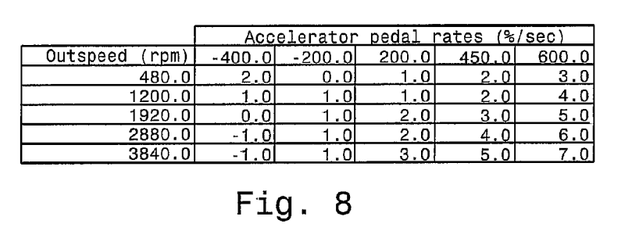
FIG. 8 is a chart that illustrates increments and decrements to the ds_counter from the accelerator pedal rate evaluation.

FIG. 8 illustrates an example of a table containing points, i.e., increments and decrements, for changing the value of ds-counter 90 awarded from the pedal rate evaluation.

Pedal Position and Engine Torque Evaluation

The pedal rate, pedal position and engine torque evaluations work together to provide sufficient points for fast response. If the driver is operating the vehicle in an economy mode and tips-in, i.e., depresses the accelerator pedal 58 rapidly or tips-in to a high pedal position PPS, the pedal rate and pedal position evaluations will provide sufficient points for a downshift. The engine torque evaluation, which provides points based on the approximate torque reserve of the engine 14, will provide zero points if the engine has significant torque reserve. If engine torque is high, it is likely that the driver will request even more torque. In this case, the engine torque evaluation will provide additional points.

The maximum pedal position and engine torque are stored during each calibrateable time interval. At the end of the interval, points are awarded based on tables of vehicle load/road grade and accelerator pedal displacement and engine torque.

Figure 9:
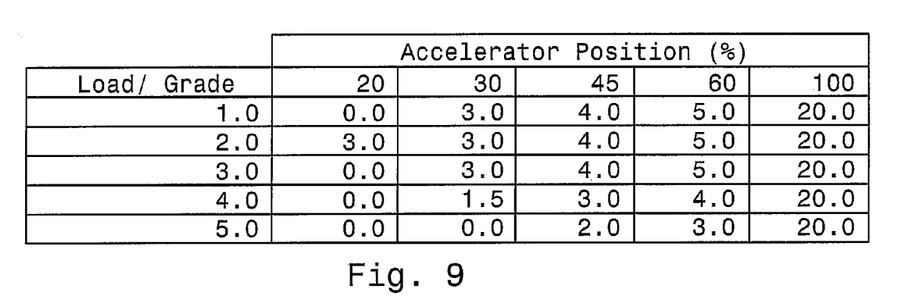
FIG. 9 is a chart that illustrates increments and decrements to the ds_counter from the accelerator pedal position evaluation.
Figure 10:
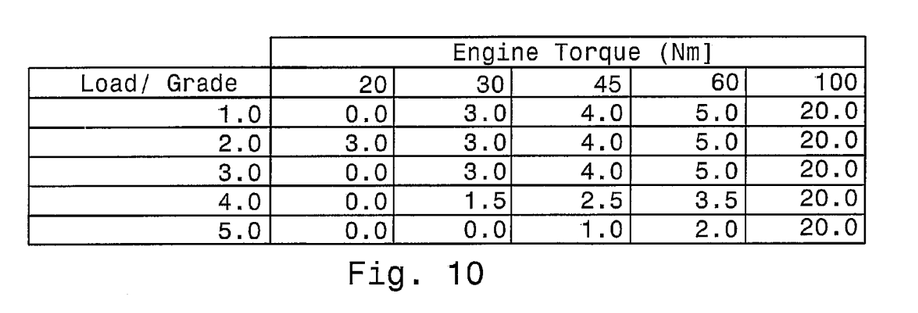
FIG. 10 is a chart that illustrates increments and decrements to the ds_counter from the engine torque evaluation.

FIG. 9 illustrates a look-up table of representative points for a range of accelerator pedal positions and a range of the load/grade index. FIG. 10 illustrates a look-up table of representative points for a range of engine torque and a range of the load/grade index.

Lateral Acceleration Evaluation

The lateral acceleration evaluation provides an increment to the value in ds_counter 90 based on vehicle acceleration by adding the increment to counter 90 at the sampling intervals. The lateral acceleration evaluation is only active within a calibrateable range of the speed of output 28. It can be switched off if both an antilock brake system (ABS) and yaw rate information are not available.

Figure 11:
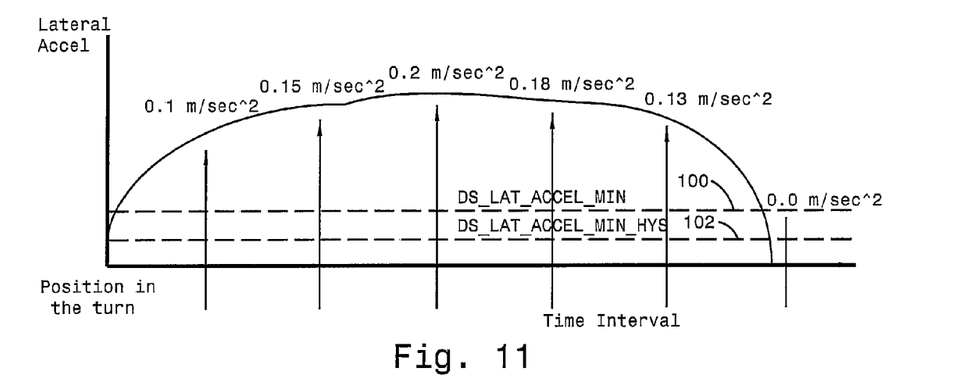
FIG. 11 is a chart that illustrates a lateral vehicle acceleration profile as the vehicle proceeds through a turn.

FIG. 11 illustrates a lateral vehicle acceleration profile as the vehicle proceeds through a turn. The lateral acceleration evaluation becomes active when the filtered lateral vehicle acceleration exceeds a reference lateral acceleration 100 and terminates when the lateral vehicle acceleration falls below a second reference lateral acceleration 102 that includes hysteresis. A lateral acceleration increment only occurs at the sampling intervals.

Figure 12:
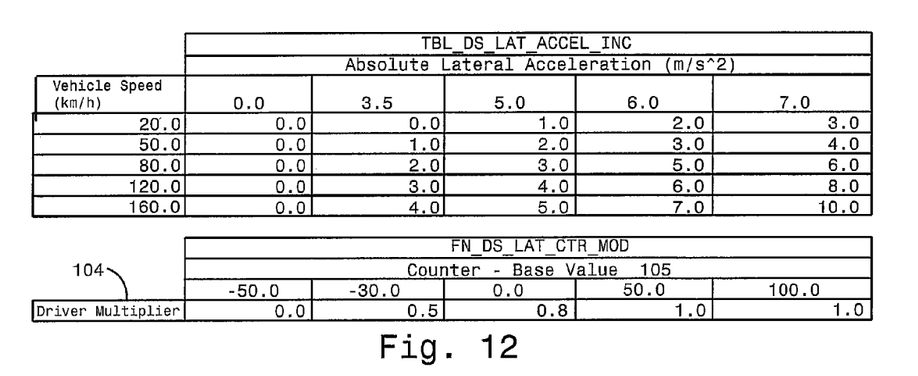
FIG. 12 is a chart that illustrates increments to the ds_counter and the driver multiplier from the lateral vehicle acceleration evaluation.

As table TBL_DS_LAT_ACCEL_INC of FIG. 12 shows, an increment attributed to lateral acceleration is determined on the basis of the maximum lateral acceleration of the vehicle during the time interval as a function of vehicle speed. As part of the look-ahead function, a driver multiplier or driver modifier 104 FN_DS_LAT_CTR_MOD is determined based on the difference 105 between the value in ds_counter 90 and the "normal" value or base value.

The final ds_counter increment attributed to lateral acceleration is determined from equation (2)

$$[TBL\_DS\_LAT\_ACCELWINC] * [FN\_DS\_LAT\_CTR\_MOD] \quad (2)$$

The driver modifier allows a driver currently exhibiting conservative behavior to maintain speed through a curve while incurring fewer points than a driver currently exhibiting aggressive behavior. In order to gain points, the conservative driver must activate the pedal rate or pedal position evaluations.

Longitudinal Acceleration Evaluation

Figure 13:
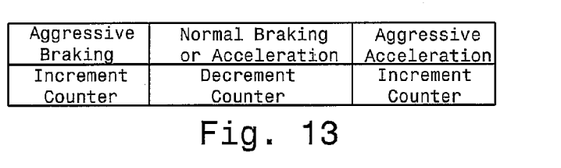
FIG. 13 is a chart that illustrates the strategy for incrementing and decrementing the ds_counter using the longitudinal vehicle acceleration evaluation.

The longitudinal acceleration evaluation increments ds_counter 90 when longitudinal vehicle acceleration is high and when wheel braking is high, and it decrements ds_counter 90 during normal or conservative longitudinal vehicle acceleration and braking, as FIG. 13 indicates. Decrementing ds_counter 90 helps the conservative driver enter the economy gear shift schedules.

Incrementing and decrementing ds_counter 90 occurs at regular time intervals.

Figure 14:
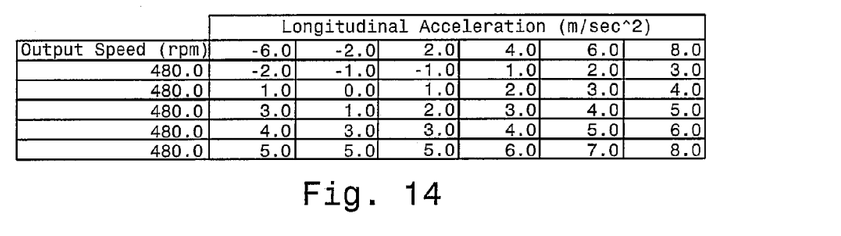
FIG. 14 is a chart that illustrates increments and decrements to the ds_counter from longitudinal vehicle acceleration evaluation.

The increment or decrement is obtained using a unique table indexed by longitudinal vehicle acceleration and the speed of output shaft 28 for each vehicle load or road grade index. The table of FIG. 14 illustrates the increments and decrements corresponding to independent variables longitudinal vehicle acceleration and output shaft speed for a load or grade index.

SST Evaluation

The select shift transmission (SST) evaluation increments or decrements ds_counter 90 so that, over time, the gear 106 that is automatically determined by the transmission controller 18 from electronically stored shift schedules 122 will match the gear 108 that is manually selected by the driver in response to movement of the PRN range and gear selector 30. The manually selected gear 108 represents the desired state and the automatically scheduled gear 106 represents the current state. Increments or decrements of the value in ds_counter 90 are used to drive the error between the desired state 108 and the current state 106 toward zero. The SST evaluation functions similarly to a closed loop controller.

Figure 15:
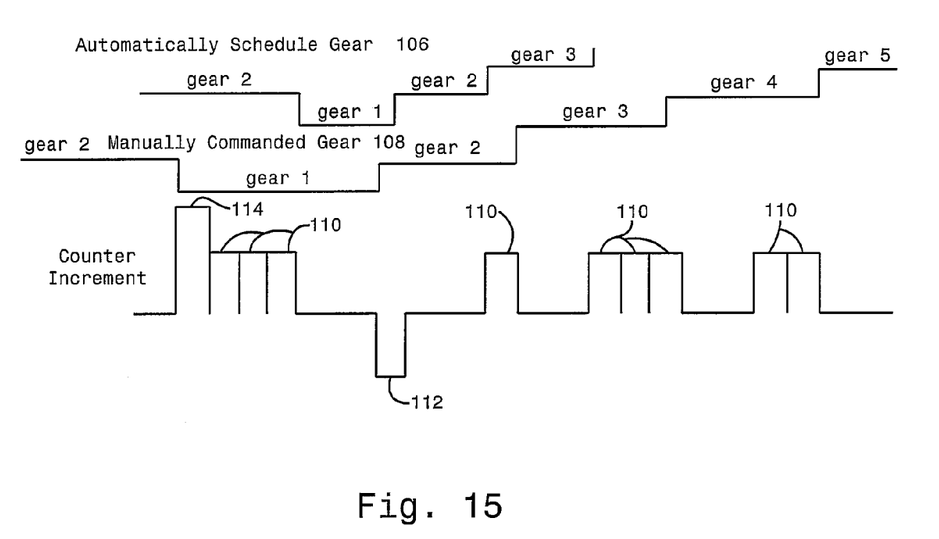
FIG. 15 is a chart that illustrates increments and decrements to the ds_counter from the SST evaluation.

As the chart of FIG. 15 illustrates, the SST evaluation increments ds_counter 90 at 110, each execution of the algorithm, provided the gear 108 that is manually selected in Sport-Tip is lower than the current automatically scheduled gear 106. Similarly, the SST evaluation decrements ds_counter 90 when the manually selected gear 108 is higher than the current automatically scheduled gear 106. The evaluation provides a unique initial increment 114 or decrement the first time the manually selected gear 108 is not equal to the automatically scheduled gear 106.

Shift Schedule Selection

Figure 16:
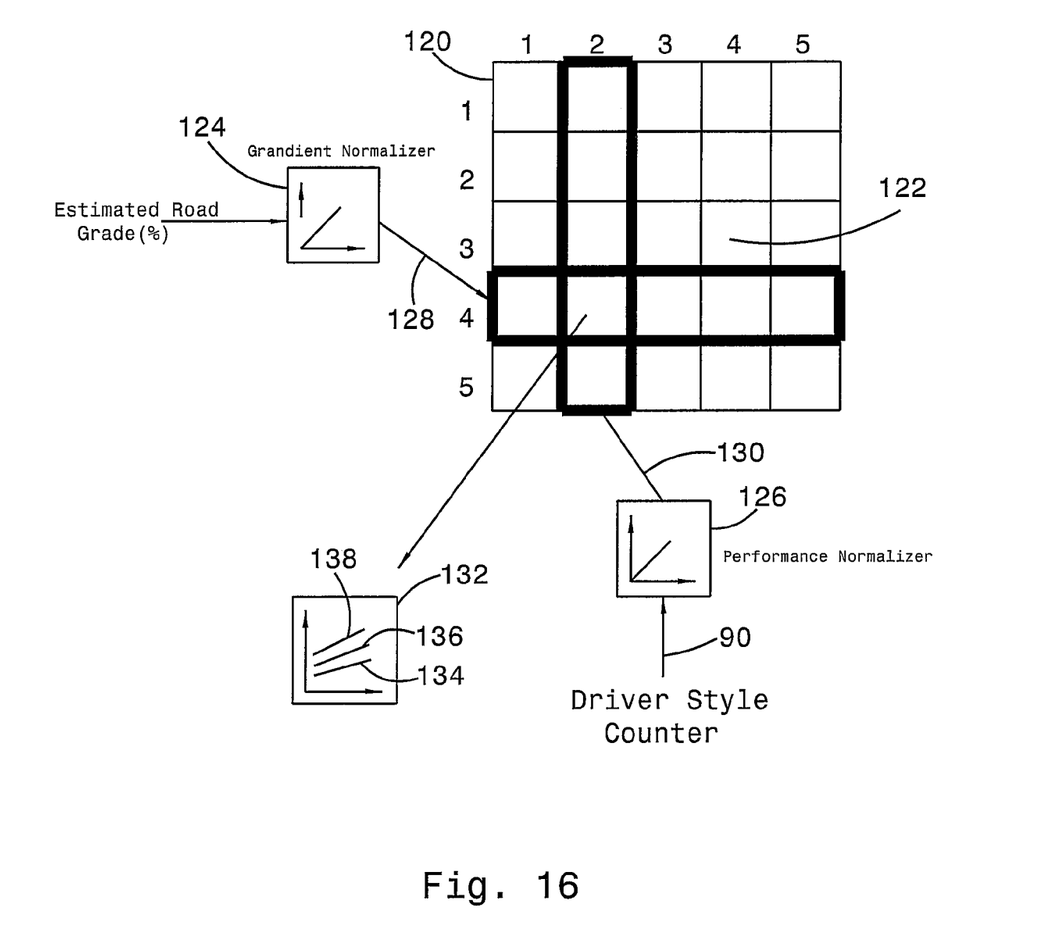
FIG. 16 is a schematic diagram showing a matrix of gear shift schedules indexed by the ds_counter and road grade.

In FIG. 16, matrix 120 contains 25 gear shift schedules 122, each schedule containing upshift and downshift curves 134, 136, 138 relating vehicle speed and driver demanded torque. Vehicle speed may be inferred from output shaft speed OSS or read directly from signals WS1, WS2 produced by speed sensors 38. The driver demanded wheel torque may be inferred from the position PPS of accelerator pedal 60 or the position TPS of the engine throttle valve 44.

Each shift schedule 122 defines a curve 134, 136, 138 for each gear change that can be produced by transmission 16, at which an upshift should occur when the curve is crossed when the current operation condition, represented by vehicle speed and demanded wheel torque, crosses the curve. Similarly, each shift schedule defines a similar curve for each gear change that can be produced by the transmission at which an downshift should occur when the curve is crossed when the current operation condition, represented by vehicle speed and demanded wheel torque, crosses the curve. For example, each shift schedule for a five speed transmission 16 will include at least five upshift curves and five downshift curves.

The matrix 120 of shift schedules 122 is indexed by a road grade normalizer 124 and a performance normalizer 126. An algorithm determines an estimate of the slope of the road on which the vehicle is operating. Each row of matrix 120 is assigned a number 1-5, which corresponds to a portion of the full range of road grades. For example, row 1 may represent the road grade range −10° to −5°; row 2, the range −5° to 3°; row 3, the range 3° to 7°; row 4, the range 7° to 10°; and row 5, the range 10° to 13°. The ranges need not be equal in magnitude or extend linearly over the full range. Normalizer 124 produces an index 128 in a range 0-5, which corresponds to the estimated road grade and the rows of matrix 120. If index 128 is not a whole number, an interpolation is made between the two shift schedules 122 on opposite sides of the index 128.

Similarly, matrix 120 is indexed by the performance normalizer 126. The driver style algorithm determines the value of ds_counter 90, which is used by the performance normalizer 126 to determine a drive style index 130. Each column of matrix 120 is assigned a number 1-5, which corresponds to break points 91-94 of the full range of values of ds_counter 90, as shown in FIG. 2. For example, column 1 may represent ds_counter range from 0 to breakpoint 91; column 2, the range from breakpoint 91 to breakpoint 92; column 3, the range from breakpoint 92 to breakpoint 93; column 4, the range from breakpoint 93 to breakpoint 94; and column 5, the range from breakpoint 94 to 255, the maximum value. The ranges need not be equal in magnitude or extend linearly over the full range. The magnitude of index 130 refers to a column containing multiple shift schedules 122 of matrix 120. If index 130 is not a whole number, an interpolation is made between the two shift schedules 122 on opposite sides of the index 130.

If neither index 128 nor index 130 is a whole number, an interpolation is made among four of the shift schedules 122 of matrix 120, such that a desired shift schedule 132 is defined and identified for use in determining the next upshift or downshift that occurs when the vehicle operating condition crosses one of the shift curves 134, 136, 138 of the desired shift schedule 132.

As FIG. 17 illustrates, the driver style algorithm 140 is controlled by a manager 142, which determines, at step 144, whether the engine 14, transmission 16 or another component of powertrain 10 is in a failure mode, in which case the ds_counter 90 is reset to the base value. If the powertrain 10 has any stability enhancement system operating, such as traction control or vehicle stability, then the value of ds_counter 90 is held in hold mode until the stability system is turned off. Otherwise, manager 142 allows the algorithm 10 to learn, i.e., to change the value of ds_counter 90 in learn mode.

At step 146, manager 142 reads a status variable of the powertrain to determine whether an incompatibility exists. For example, if the powertrain is in drive-off operation, then the longitudinal evaluation is inoperative based on a calibrateable priority.

At step 148, the leaky bucket function 150 is called and the value of ds_counter 90 from the last execution is used in the leaky bucket, which is combined with the slope and intercept to determine a new value of ds_counter 90, as described with reference to FIGS. 3 and 4. This call allows at least one execution of algorithm 140 before a new shift table is determined and a gear shift is executed.

At step 152, manager 142 calls the evaluations, which are executed in a predetermined order, assuming the status variable does not affect the execution order, and the value of ds_counter 90 is incremented and decremented according to the result 156 of each evaluation, input 158 from the leaky bucket 150, and input 160 from step 144 of manager 142.

At step 162, the mode is determined based on the manager state 144, e.g., the count remains unchanged while in the hold mode.

At step 164, the position of shift lever 30 is monitored for movement between its normal position in gate 96, Sport position, Xsport position and the+and−positions that indicate the driver has manually commanded an upshift or downshift, respectively.

At step 166, the changes from all sources 156, 158, 160 are added algebraically to the current value of the ds_counter 90. The desired shift schedule 132 is determined and gear changes in transmission 16 are performed with reference to the gear shift curves of that schedule and the current vehicle operating condition, as described with reference to FIG. 16.

In accordance with the provisions of the patent statutes, the preferred embodiment has been described. However, it should be noted that the alternate embodiments can be practiced otherwise than as specifically illustrated and described.

The invention claimed is:

1. A method for establishing a gear shift schedule, comprising:
    (a) developing shift schedules and a current value representing driving behavior;
    (b) using gear selector movement to determine a driving mode having a base;
    (c) updating, using a controller, the current value by adding a first value determined from a difference between the current value and the base, and values determined from evaluations of current driving behavior;
    (d) establishing a current shift schedule based on the updated current value and the shift schedules.

2. The method of claim 1 further comprises the steps of producing a gear change define by said current shift schedule.

3. The method of claim 1 wherein step (c) further comprises the steps of:
    determining a rate of change on the basis of the difference;
    determining a product produced by multiplying the rate of change and the current value;
    determining a reference value on the basis of the difference;
    producing a sum by adding the reference value and the product; and
    updating of the current value by a magnitude of the sum.

4. The method of claim 1 wherein step (c) further comprises the steps of:
    the updating the current value by the value of an entry offset in response to a change between driving modes;
    determining a rate of change of the current value on the basis of the difference;
    determining the first value from a product produced by multiplying the rate of change and the current value;
    determining a reference value on the basis of the difference;
    producing a sum by adding the reference value and the product; and
    updating of the current value by a magnitude of the sum.

5. The method of claim 1 wherein step (c) further comprises the steps of:
    performing a drive-off evaluation of driving behavior; and
    updating the current value by a value determined from a magnitude of accelerator pedal displacement.

6. The method of claim 1 wherein step (c) further comprises the steps of:
    performing a pedal-rate evaluation of driving behavior; and
    updating the current value by a value determined from a rate of accelerator pedal displacement.

7. The method of claim 1 wherein step (c) further comprises the steps of:
    determining that an accelerator pedal has been depressed at a relatively high rate;
    performing a pedal-level evaluation of driving behavior; and
    updating the current value by a value determined from the rate of accelerator pedal displacement and that produces a downshift between gears of the transmission.

8. The method of claim 1 wherein step (c) further comprises the steps of:
   determining that an accelerator pedal has been depressed to a relatively large displacement;
   performing a pedal-level evaluation of driving behavior; and
   updating the current value by a value determined from the displacement of accelerator pedal and that produces a downshift between gears of the transmission.

9. The method of claim 1 wherein step (c) further comprises the steps of:
   operating an engine to produce a magnitude of engine torque that is transmitted to the transmission;
   updating the current value by a value determined from the magnitude of engine torque and a reserve capacity of the engine to produce torque in excess of the produced magnitude of engine torque.

10. The method of claim 1 wherein step (c) further comprises the steps of:
    determining a lateral acceleration of a vehicle and a speed of the vehicle;
    using the lateral acceleration of the vehicle and the speed of the vehicle to determine a potential change in the current value of the count;
    using the difference to determine a modifier; and
    updating the current value by a second product produced by multiplying the potential change in the current value and the modifier.

11. The method of claim 1 wherein step (c) further comprises the steps of:
    determining a longitudinal acceleration of a vehicle and a speed of an output shaft of the transmission;
    using the longitudinal acceleration of the vehicle and the speed of the output shaft to determine a change in the current value associated with longitudinal acceleration of the vehicle;
    updating the current value by the change in the current value associated with longitudinal acceleration of the vehicle.

12. The method of claim 1 wherein step (c) further comprises the steps of:
    increasing the current value when a gear selected by manual control of the gear selector is a lower gear than a gear in which the transmission is operating; and
    decreasing the current value when a gear selected by manual control of the gear selector is a higher gear than a gear in which the transmission is operating.

13. A method for adjusting a schedule that defines conditions at which gear changes of a transmission occur, comprising:
    (a) repetitively updating, using a controller, a current value of a count using a first value determined from a difference between the current value of the count and a base value of a driving mode determined from movement of a gear selector;
    (b) performing evaluations of driving behavior and updating the current value of the count by a value determined from the evaluations;
    (c) developing shift schedules that define gear changes able to be produced by the transmission; and
    (d) establishing a current shift schedule based on the updated current value of the count and the shift schedules.

14. The method of claim 13 further comprises the steps of:
    using manual control of a gear selector to determine a desired transmission range and a base value for the desired range; and
    updating of the current value on the basis of a difference between the current value and the base value for the desired range.

15. The method of claim 14 wherein step (b) further comprises the steps of:
    determining a rate of change of the current value on the basis of the difference;
    determining a change of the current value from a product produced by multiplying the rate of change and the current value;
    determining a reference value on the basis of the difference;
    producing a sum by adding the reference value and the product; and
    updating of the current value by a magnitude of the sum.

16. The method of claim 14 wherein step (b) further comprises the steps of:
    the updating the current value of the count by the value of an entry offset in response to a change between desired ranges of the transmission;
    determining a rate of change of the current value on the basis of the difference;
    determining a change of the current value from a product produced by multiplying the rate of change and the current value;
    determining a reference value on the basis of the difference;
    producing a sum by adding the reference value and the product; and
    updating of the current value by a magnitude of the sum.

17. The method of claim 13 wherein step (c) further comprises the steps of:
    determining shift schedules representing a range that extends from conservative driving behavior to aggressive driving behavior and indexed by the updated current value, each shift schedule defining the occurrence of desired gear changes at an indexed position within said range in response to a vehicle speed and a degree of displacement of an accelerator pedal.

18. The method of claim 13 wherein:
    step (c) further comprises the step of determining shift schedules representing a range that extends from conservative driving behavior to aggressive driving behavior, each shift schedule defining the occurrence of desired gear changes within said range in response to a vehicle speed and a degree of displacement of an accelerator pedal; and
    step (d) further comprises the steps of using the updated current value to determine a performance normalizer that that extends over a range from conservative driving behavior to aggressive driving behavior; and interpolating the timing of the gear changes that are defined by two shift schedules indexed by the performance equalizer.

19. The method of claim 13 wherein step (b) further comprises the steps of:
    performing a drive-off evaluation of driving behavior; and
    updating the current value of the count by a value determined from a magnitude of accelerator pedal displacement.

20. The method of claim 13 wherein step (b) further comprises the steps of:
    performing a pedal-rate evaluation of driving behavior; and
    updating the current value of the count by a value determined from a rate of accelerator pedal displacement.

21. The method of claim 13 wherein step (b) further comprises the steps of:
- determining that an accelerator pedal has been depressed at a relatively high rate;
- performing a pedal-level evaluation of driving behavior; and
- updating the current value of the count by a value determined from the rate of accelerator pedal displacement and that produces a downshift between gears of the transmission.

22. The method of claim 13 wherein step (b) further comprises the steps of:
- determining that an accelerator pedal has been depressed to a relatively large displacement;
- performing a pedal-level evaluation of driving behavior; and
- updating the current value of the count by a value determined from the displacement of accelerator pedal and that produces a downshift between gears of the transmission.

23. The method of claim 13 wherein step (b) further comprises the steps of:
- operating an engine to produce a magnitude of engine torque that is transmitted to the transmission;
- updating the current value of the count by a value determined from the magnitude of engine torque and a reserve capacity of the engine to produce torque in excess of the produced magnitude of engine torque.

24. The method of claim 13 wherein step (b) further comprises the steps of:
- determining a lateral acceleration of the vehicle and a speed of the vehicle;
- using the lateral acceleration of the vehicle and the speed of the vehicle to determine a potential change in the current value of the count;
- using manual control of a gear selector to determine a desired transmission range and a base value for the desired range;
- using the difference to determine a modifier; and
- updating the current value of the count by a second product produced by multiplying the potential change in the current value of the count and the modifier.

25. The method of claim 13 wherein step (b) further comprises the steps of:
- determining a longitudinal acceleration of the vehicle and a speed of an output shaft of the transmission;
- using the longitudinal acceleration of the vehicle and the speed of the output shaft to determine a change in the current value of the count associated with longitudinal acceleration of the vehicle;
- updating the current value of the count by the change in the current value of the count associated with longitudinal acceleration of the vehicle.

26. The method of claim 13 wherein step (b) further comprises the steps of:
- increasing the current value of the count when a gear selected by manual control of the gear selector is a lower gear than a gear in which the transmission is operating; and
- decreasing the current value of the count when a gear selected by manual control of the gear selector is a higher gear than a gear in which the transmission is operating.

* * * * *